United States Patent
Lindheimer et al.

(10) Patent No.: US 10,721,789 B2
(45) Date of Patent: Jul. 21, 2020

(54) HANDLING OF BACKUP PATH IN A WIRELESS COMMUNICATION SYSTEM

(71) Applicant: TELEFONAKTIEBOLAGET LM ERICSSON (PUBL), Stockholm (SE)

(72) Inventors: Christofer Lindheimer, Linköping (SE); Jari Vikberg, Järna (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 183 days.

(21) Appl. No.: 15/523,109

(22) PCT Filed: Oct. 30, 2014

(86) PCT No.: PCT/EP2014/073391
§ 371 (c)(1),
(2) Date: Apr. 28, 2017

(87) PCT Pub. No.: WO2016/066210
PCT Pub. Date: May 6, 2016

(65) Prior Publication Data
US 2017/0318484 A1    Nov. 2, 2017

(51) Int. Cl.
*H04W 76/16*    (2018.01)
*H04W 76/22*    (2018.01)
(Continued)

(52) U.S. Cl.
CPC ............ *H04W 76/16* (2018.02); *H04W 24/04* (2013.01); *H04W 40/02* (2013.01); *H04W 76/22* (2018.02);
(Continued)

(58) Field of Classification Search
CPC ....... H04L 45/22; H04L 69/14; H04L 69/163; H04W 8/30; H04W 24/04; H04W 40/02;
(Continued)

(56) References Cited

U.S. PATENT DOCUMENTS

| | | | |
|---|---|---|---|
| 2004/0190454 A1* | 9/2004 | Higasiyama | ........ H04L 12/4625 370/238 |
| 2006/0083243 A1* | 4/2006 | Igarashi | .................. H04L 45/02 370/392 |

(Continued)

FOREIGN PATENT DOCUMENTS

| | | |
|---|---|---|
| CN | 101453744 A | 6/2009 |
| WO | 2015174901 A1 | 11/2015 |
| WO | 2016066211 A1 | 5/2016 |

OTHER PUBLICATIONS

Ford, et al., TCP Extensions for Multipath Operation with Multiple Addresses, Internet Engineering Task Force (IETF) RFC 6824, Jan. 2013.

(Continued)

*Primary Examiner* — Asad M Nawaz
*Assistant Examiner* — Kai Chang
(74) *Attorney, Agent, or Firm* — Patent Portfolio Builders, PLLC

(57) ABSTRACT

A method of handling multipath connections in a Public Land Mobile Network (PLMN). The method comprising the steps of determining within the PLMN that a path, established across the PLMN, is a backup path of a multipath connection and providing an explicit indication to one or more nodes within the PLMN that the path is a backup path using a protocol layer that is otherwise unaware of the multipath connection. The method further comprises the step of, at the or each notified node, applying a handling to the path that is differentiated from the handling of non-backup paths.

14 Claims, 17 Drawing Sheets

(51) Int. Cl.
  *H04W 40/02* (2009.01)
  *H04W 24/04* (2009.01)
  *H04W 8/30* (2009.01)
  *H04W 80/06* (2009.01)
  *H04W 84/12* (2009.01)
  *H04L 12/707* (2013.01)
  *H04L 29/06* (2006.01)

(52) U.S. Cl.
  CPC .............. *H04L 45/22* (2013.01); *H04L 69/14* (2013.01); *H04L 69/163* (2013.01); *H04W 8/30* (2013.01); *H04W 80/06* (2013.01); *H04W 84/12* (2013.01)

(58) Field of Classification Search
  CPC ..... H04W 76/16; H04W 76/22; H04W 80/06; H04W 84/12
  See application file for complete search history.

(56) References Cited

U.S. PATENT DOCUMENTS

| | | | |
|---|---|---|---|
| 2006/0256712 A1* | 11/2006 | Imajuku | H04J 14/0284 370/218 |
| 2009/0059848 A1* | 3/2009 | Khetawat | H04L 29/12367 370/328 |
| 2009/0067324 A1* | 3/2009 | Licardie | H04L 12/40182 370/225 |
| 2010/0248713 A1 | 9/2010 | Parker | |
| 2011/0188387 A1* | 8/2011 | Das | H04L 43/00 370/252 |
| 2011/0296006 A1* | 12/2011 | Krishnaswamy | H04L 45/00 709/224 |
| 2011/0314145 A1* | 12/2011 | Raleigh | H04L 41/0893 709/224 |
| 2012/0014350 A1 | 1/2012 | Kim et al. | |
| 2012/0151030 A1* | 6/2012 | Guttman | H04L 45/24 709/223 |
| 2012/0188949 A1* | 7/2012 | Salkintzis | H04L 45/308 370/329 |
| 2012/0239966 A1* | 9/2012 | Kompella | H04W 24/04 714/4.11 |
| 2012/0294155 A1* | 11/2012 | Yin | H04W 24/04 370/242 |
| 2013/0021916 A1* | 1/2013 | Zhou | H04W 28/00 370/241 |
| 2013/0083722 A1* | 4/2013 | Bhargava | H04W 48/20 370/315 |
| 2013/0142034 A1* | 6/2013 | Yang | H04L 45/22 370/218 |
| 2013/0322232 A1* | 12/2013 | Csaszar | H04L 45/16 370/217 |
| 2014/0119199 A1* | 5/2014 | Watanabe | H04W 24/04 370/242 |
| 2014/0169330 A1* | 6/2014 | Rommer | H04W 36/08 370/331 |
| 2015/0029855 A1* | 1/2015 | Zheng | H04L 45/16 370/235 |
| 2015/0095502 A1* | 4/2015 | Le Bolzer | H04L 45/24 709/227 |
| 2015/0173000 A1* | 6/2015 | Basilier | H04W 48/18 370/329 |
| 2015/0215345 A1* | 7/2015 | Agarwal | H04L 69/163 709/227 |
| 2015/0312383 A1* | 10/2015 | Roeland | H04L 69/18 370/331 |
| 2015/0327130 A1* | 11/2015 | Park | H04W 36/0055 455/436 |
| 2016/0037428 A1* | 2/2016 | Kanugovi | H04L 69/16 370/329 |
| 2016/0212759 A1* | 7/2016 | Schliwa-Bertling | H04L 69/14 |
| 2016/0261726 A1* | 9/2016 | Chen | H04W 92/14 |
| 2017/0041836 A1* | 2/2017 | Huang | H04L 29/06 |
| 2017/0085484 A1* | 3/2017 | Hellander | H04L 69/14 |
| 2017/0104717 A1* | 4/2017 | Vesterinen | H04W 8/26 |
| 2017/0118787 A1* | 4/2017 | Kekki | H04W 76/16 |

OTHER PUBLICATIONS

Office Action issued in application No. 14792796.6, dated Mar. 1, 2019; 6 pages.

* cited by examiner

HANDLING OF BACKUP PATH IN A WIRELESS COMMUNICATION SYSTEM

This application is a 371 of International Application No. PCT/EP2014/073391, filed Oct. 30, 2014, the disclosure of which is fully incorporated herein by reference.

TECHNICAL FIELD

The technical field is the handling of multipath connections in a communication system comprising a Public Land Mobile Network (PLMN).

BACKGROUND

Many applications which use mobile communication systems require a high level of reliability. Such applications include remote health monitoring, remote health-care, monitoring of large advanced systems, power grid management and other industry automation control etc. These applications may be bit-error sensitive or delay sensitive.

In order to provide a high level of reliability, it is common to provide backup paths as a protection against the failure of the main or regular path. Typically these backup paths are provided on a different Radio Access Technology (RAT), for example if Wi-Fi is used for the regular path, then a 3GPP backup path will be provided. Such an arrangement is typically provided using a multipath protocol such as Multi-Path Transmission Control Protocol (MPTCP), which has the facility to provide multiple paths across different RAT's, giving the high level of reliability required.

However, there are drawbacks to establishing and maintaining such backup paths. Such paths are typically used to transmit only control signalling to maintain the backup path, for example establishment, release and possible keep-alive signalling for the backup path, and are only occasionally associated with data traffic. It is also necessary to create both radio access network and core network level of connectivity to enable establishment and release of backup paths. One example is in relation to 3GPP Evolved Packet System (EPS) which comprises both LTE (E-UTRAN) radio access network and Evolved Packet Core (EPC) network. User Equipment (UE) that wants to establish a backup path, e.g. using MPTCP, needs to enter a so called "connected" state to enable communication towards an MPTCP-server via the EPS. The UE is normally in the "connected" state for a short while and then moves to an "idle" state. When the backup path is to be released, the UE needs to again enter the "connected" state to signal the release of the backup path. Therefore, a lot of signalling overhead may be introduced without any useful information being sent, resulting in additional load on different network nodes and increased interference on other signals. In some situations, for example, when there is high load on a network, it may be desirable to limit the backup paths that do not carry any traffic, for example by restricting their usage of network resources via connection admission control, by giving subflows associated with such paths a lower priority compared to other paths/subflows or by restricting their power.

In order to implement such restrictions, it is necessary for the networks to recognise which paths are backup paths. It is also beneficial to recognise when a UE has only backup paths in a particular radio access network. Two mechanisms exist in the prior art for identifying backup subflows. The first of these is the use of the "B" bit in the MPTCP header. The second is the use of deep packet inspection in the network to identify subflows in which little or no data is being transmitted. Both of these mechanisms require a radio level connection, together with associated core network level connectivity, and a backup path to be already setup before identification of the backup path/subflow can take place.

SUMMARY

Accordingly, in a first aspect of the present invention, there is provided a method of handling multipath connections in a communication system comprising a Public Land Mobile Network (PLMN). The method comprising the steps of determining within the PLMN that a path, established across the PLMN, is a backup path of a multipath connection and providing an explicit indication to one or more nodes within the PLMN that the path is a backup path using a protocol layer that is otherwise unaware of the multipath connection. The method further comprises the step of, at the or each notified node, applying a handling to the path that is differentiated from the handling of non-backup paths.

The multipath connection may comprise a Multi-Path Transmission Control Protocol (MPTCP) connection.

The one or more nodes may comprise one or more of an eNodeB, a Management Mobility Entity (MME), a Serving Gateway (SGW), a Packet Data Node Gateway (PDN-GW), a Policy Charging and Rules Function (PCRF) node and a Home Subscriber Server (HSS).

Optionally the explicit indication is provided in bearer set-up or bearer modification signalling.

Optionally the step of providing an explicit indication comprises the step of setting a marker associated with a packet.

Optionally the marker is located in one of a GTP-U header and an IP header.

The method may further comprise the step of setting a Flow Type Indicator (FTI) to indicate a type of flow for the path.

The FTI may indicate that the type of flow is one of an additional flow to an earlier established flow, a flow that should be realised over at least two EPS bearers, a flow that is new and not related to any other flow, and a backup flow.

The method may further comprises the steps of identifying an Immediate Characteristic Needs (ICN) set of the path and transmitting an indication of the ICN to the one or more nodes.

The ICN set may comprise one or more of an indication as to how quickly a backup may be needed and the bit rate at which the backup must be supplied.

The step of applying handling to the path may comprise one or more of an implementation of a Quality Of Service (QOS) mechanism, a resource management or a charging function.

According to a second aspect of the invention there is provided an apparatus for use in a PLMN. The apparatus comprises processor circuitry, a storage unit for storing instructions executable by the processor circuitry, and a transmitter, whereby the apparatus is operative to determine within the PLMN that a path, established across the PLMN, is a backup path of a multipath connection and to provide an explicit indication to one or more nodes within the PLMN that the path is a backup path using a protocol layer that is otherwise unaware of the multipath connection.

According to a third aspect of the present invention there is provided an apparatus for use in a public land mobile network (PLMN). The apparatus comprises processor circuitry, a storage unit for storing instructions executable by the processor circuitry, and a receiver, whereby the apparatus is operative to receive an indication that a path established across the PLMN is a backup path of a multipath connection, the indication being located in a protocol layer that is otherwise unaware of the multipath connection. The apparatus is further configured to, in response to the indication, apply a handling to the path that is differentiated from the handling of non-backup paths.

According to a fourth aspect of the present invention there is provided a network node comprising apparatus according to the second or third aspects of the invention.

DETAILED DESCRIPTION

Embodiments will now be described more fully hereinafter with reference to the accompanying drawings, in which certain embodiments are shown. However, other embodiments in many different forms are possible within the scope of the present disclosure. Rather, the following embodiments are provided by way of example so that this disclosure will be thorough and complete, and will fully convey the scope of the disclosure to those skilled in the art. The embodiments herein described relate principally to the Evolved Packet System (EPS), although the person skilled in the art will appreciate that the invention can be applied to any similar technology.

Figure 1:
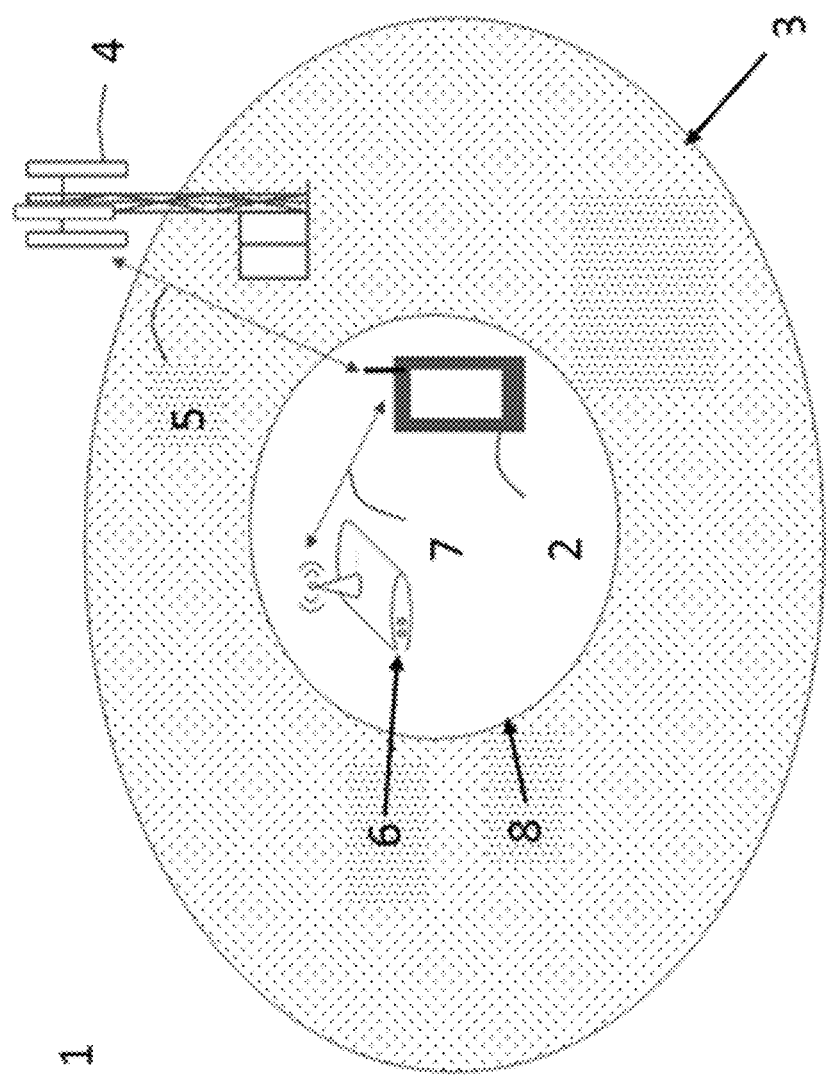
FIG. 1 is a schematic diagram of typical radio access network.

FIG. 1 is a schematic view of typical radio access network (1). FIG. 1 shows user equipment (2) located inside a cell (3) which is served by radio node (4) which may be an eNodeB, a Home Node B, a Home eNodeB, a femto base station, a pico base station or any other typical network unit. User equipment (2) may establish a radio connection (5) with radio base station (4). Within the cell there is also shown a wireless access point (6) for providing Wi-Fi services. The user equipment (2), which may be mobile phone, a laptop, a Personal Digital Assistant (PDA), a tablet or other such device has the option of establishing a connection (7) with Wi-Fi network (8) through the Wi-Fi access point (6).

Figure 2:
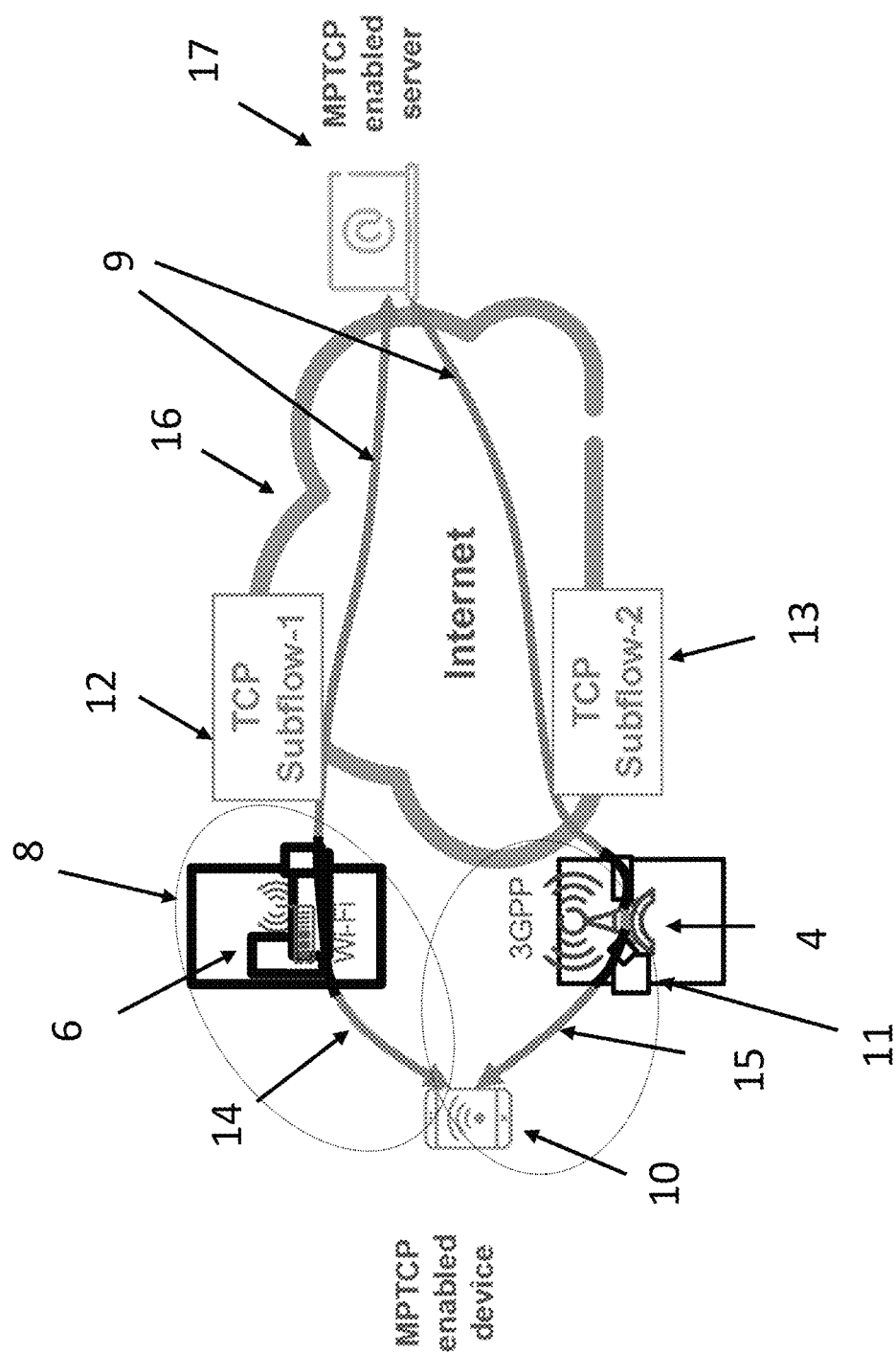
FIG. 2 is a schematic diagram of a network supporting TCP sub-flows for an MPTCP system.

Multipath connections using different Radio Access Technologies may be set up in such a network, typically using Multi-path Transport Connection Protocol (MPTCP). Typically if a multi-path connection is to be established with regular and backup paths, the regular path are established from the user equipment through the Wi-Fi network. Backup paths are typically established through 3GPP. FIG. 2 is a diagram of the logical layout of multipath connection (9). There is shown MPTCP enabled device (10) connected to Wi-Fi network (8) and 3GPP network (11). Two MPTCP paths are illustrated, first path (12) and second path (13). First path (12) is carried on Wi-Fi connection (14) to Wi-Fi access point (6). Second path (13) is carried on 3GPP connection (15) to radio base station (4). The MPTCP paths pass through external network (16) to MPTCP enabled server (17). In an alternative embodiment these two flows may join up at an MPTCP enabled proxy if the target server is not MPTCP enabled.

Figure 3:
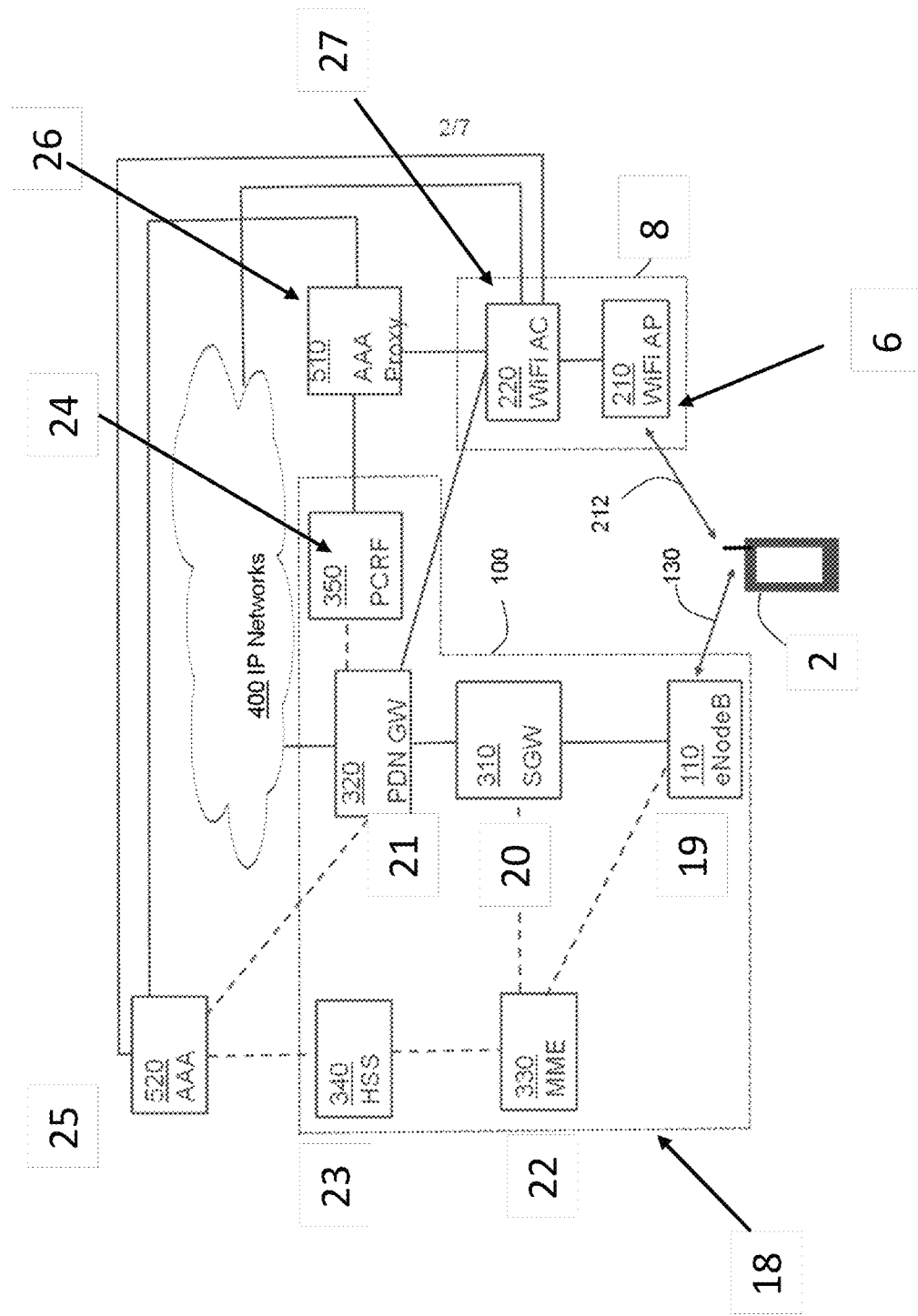
FIG. 3 is a schematic diagram of typical Public Land Mobile Network, showing the radio access network, Wi-Fi network and core network.

The connections from the 3GPP network and the Wi-Fi network are linked together, to the Internet and the Public Switched Telephone Network (PSTN) via a core network such as an Evolved Packet Core (EPC) network. FIG. 3 is a schematic view of such an arrangement. There is illustrated EPC (18), which comprises eNodeB (19), Serving Gateway (SGW) (20), Packet Data Network Gateway (PDN-GW) (21), Management Mobility Entity (MME) (22), the Home Subscriber Server (HSS) (23) and the Policy Charging and Rules Function (PCRF) (24), also known as the Policy Control Network (PCN). There is also an authentication node (25) also known as the Authentication Authorisation And Accounting (AAA) node and AAA proxy node (26).

There is also illustrated Wi-Fi network (8), comprising Wi-Fi access point (6) and Wi-Fi access controller (AC) (27). Wi-Fi access network (8) is typically connected via Wi-Fi AC (27) to PDN-GW (21). PDN-GW (21) is typically linked to IP networks and ultimately to the Internet and the Public Switched Telephone Network (PSTN).

It should be noted that the configuration of the Wi-Fi network described above is only an illustrative example described to help understand the embodiments presented herein. It should therefore be understood that the Wi-Fi network may be configured or arranged in several other ways and may comprise several further network nodes or entities. For example, Wi-Fi network nodes may be connected to a Broadband Network Gateway (BNG) in the wired LAN. In another example, network nodes may be co-located with a Residential Gateway (RG). In a further example, the Wi-Fi network may also comprise a Trusted WLAN Access Gateway (TWAG) configured to communicate with Wi-Fi network node.

The differentiation of backup paths and regular paths occurs both in the radio access network and the core packet network. In the access network, backup paths may be given a lower power and may also be rejected by Connection Admission Control (CAC). In the core network, different Quality Of Service (QOS) levels may be assigned to backup paths than regular paths. This operation is typically performed at the PDN-GW, where traffic is classified into different Service Data Flows (SDF) and then apply different QOS rules for each SDF or aggregated SDF's on a bearer. Associated with a bearer is a Traffic Flow Template (TFT), which enables the identification of packets associated with that bearer. QOS parameters may include QOS Class Identifier (QCI), Allocation and Retention Policy (ARP), Guaranteed Bit Rate (GBR) and Maximum Bit Rate (MBR).

Figure 4:
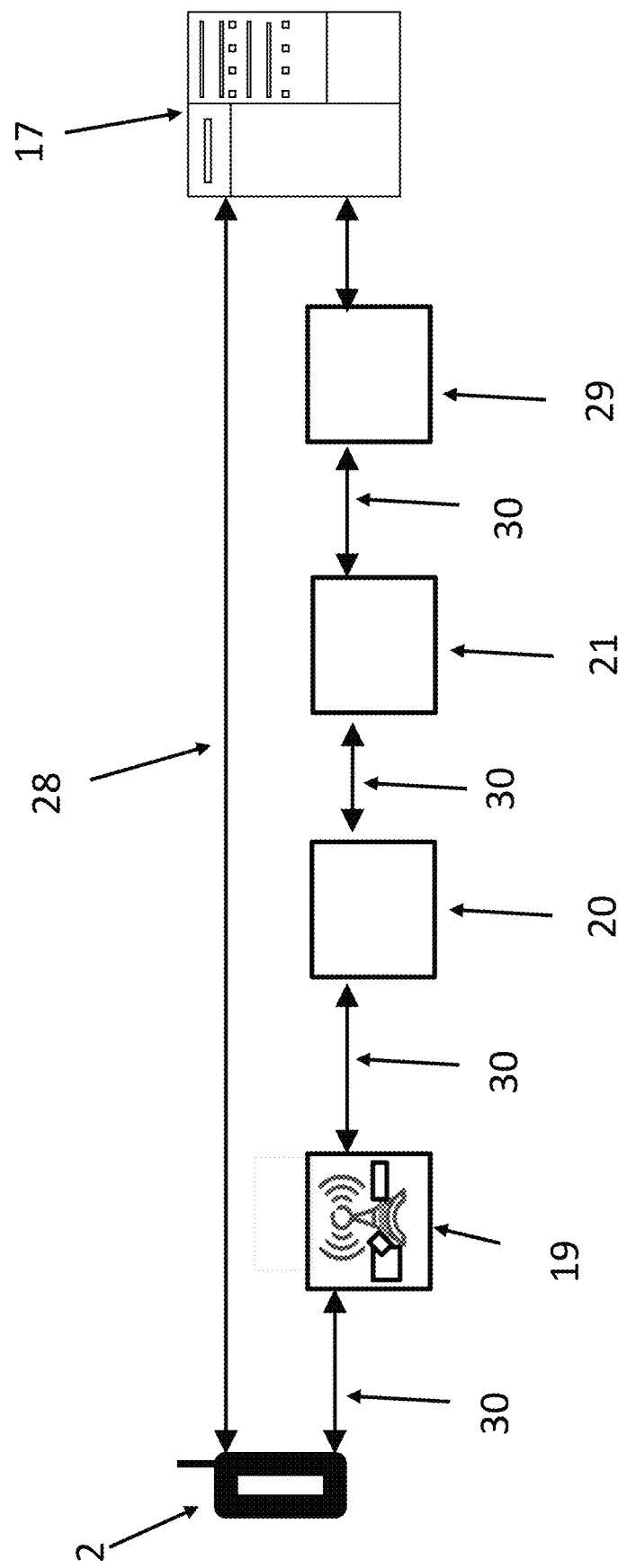
FIG. 4 is a schematic diagram of the connections between terminating and intermediate nodes for TCP and lower protocol layers.

An indication that a path is a backup is conventionally provided in the B-bit of the MPTCP segment header. The TCP layer is however transparent to intermediate nodes during normal protocol operations. FIG. 4 is a schematic diagram showing the nodes of the radio access network, the core network and the host server for a connection. It shows TCP connection (28) between UE (2) and host server (17), which is not terminated in any of the intermediate network nodes, including eNodeB (19), SGW (20), PDN-GW (21) and nodes (29) outside of the Evolved Packet Core network. In contrast the lower network layers (30) may be terminated at these intermediary nodes. The TCP layer is also not passed to the control nodes such as the MME, the HSS and PCRF node.

Figure 5:
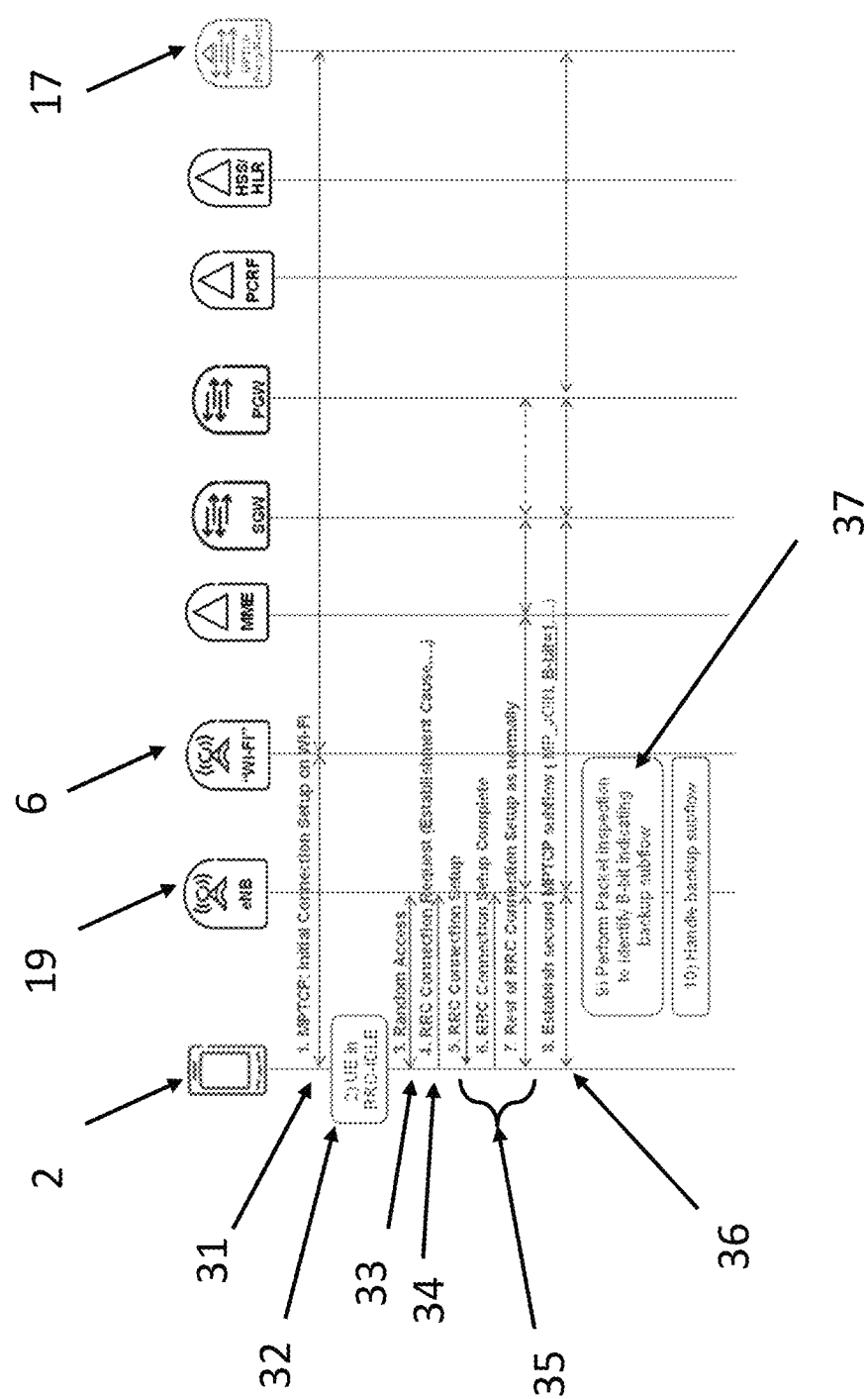
FIG. 5 is a signalling diagram of connection setup procedure for a backup path.

A method according to the prior art of establishing whether a path is a backup is to use a technique such as shallow packet inspection to read the B-bit in the MPTCP header or deep packet inspection to determine whether the packets contain data. In order to achieve this however, a path must already be set up across the network. Considerable signalling must be performed before such a detection of a backup is possible. FIG. 5 is a diagram showing the connection setup procedure. Before the backup path is established, a main path is established (31) between UE and MPTCP enabled host/proxy (17). At this point the UE (2) is in RRC-IDLE mode (32). The process of establishing a backup path begins with a random access request (33) to the eNodeB (19) from UE (2). A Random access procedure is initially performed, followed by RRC connection establishment (34) and further steps (35) needed for the UE (2) to enter "connected" state. The UE (2) must be in this connected state to enable communication through both the radio access network and the core network. Only when these steps have completely been finished can the MPTCP backup path be established (36). At that point, packet inspection may be performed (37).

In order to be able to inform intermediate and control nodes that a path is a backup an explicit indication is provided in network layers which are terminated at the intermediate nodes. In an embodiment of the invention, the explicit indication is provided in protocol layers below the TCP layer. In alternative embodiments of the invention, the explicit indication is provided in higher protocol layers in the control plane. Without the explicit indication, these network protocol layers would not otherwise be aware of that they were supporting a backup path. The use of such protocol layers allows an indication to be transmitted from one node which is aware that a path is a backup to one which is not. The network node which is aware of the backup path may have obtained this information by means of, for example shallow packet inspection to read the B-bit or deep packet inspection to recognise the type of packets present in the sub-flow associated with the path. Alternatively, the node may recognise a backup path by means of analysing the QOS requirements. The invention is not limited to any one means of the sending node obtaining information concerning the nature of a path.

Figure 6:
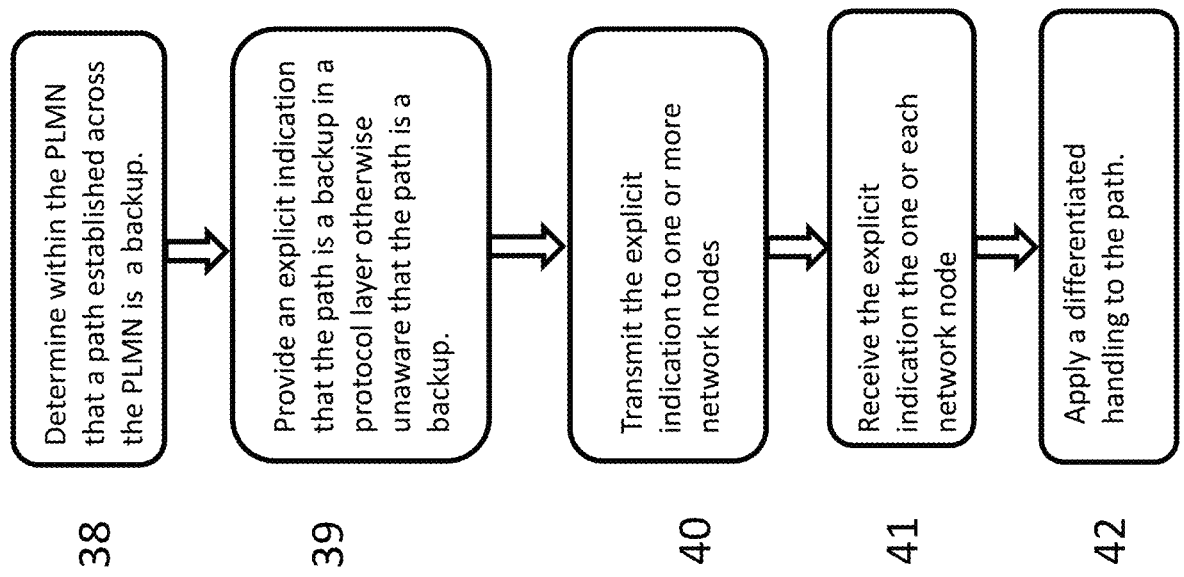
FIG. 6 is a flow diagram for a method of providing and transmitting an explicit indication of a backup path.

FIG. 6 is a flow chart for the process of creating an explicit indication, according to an embodiment, once the path has been identified as a backup path (38). The explicit indication is provided in the set-up request to indicate that the path is for a backup (39). In an embodiment the indication is placed in the set-up request for a bearer. In another embodiment the indication is placed in a modification request for an established bearer. The set-up request, or modification request, is then sent to a second network node (40). Upon receipt of the set-up request or modification request, then the explicit indication is read (41) and the appropriate differentiated handling of the path is performed (42).

Figure 7:
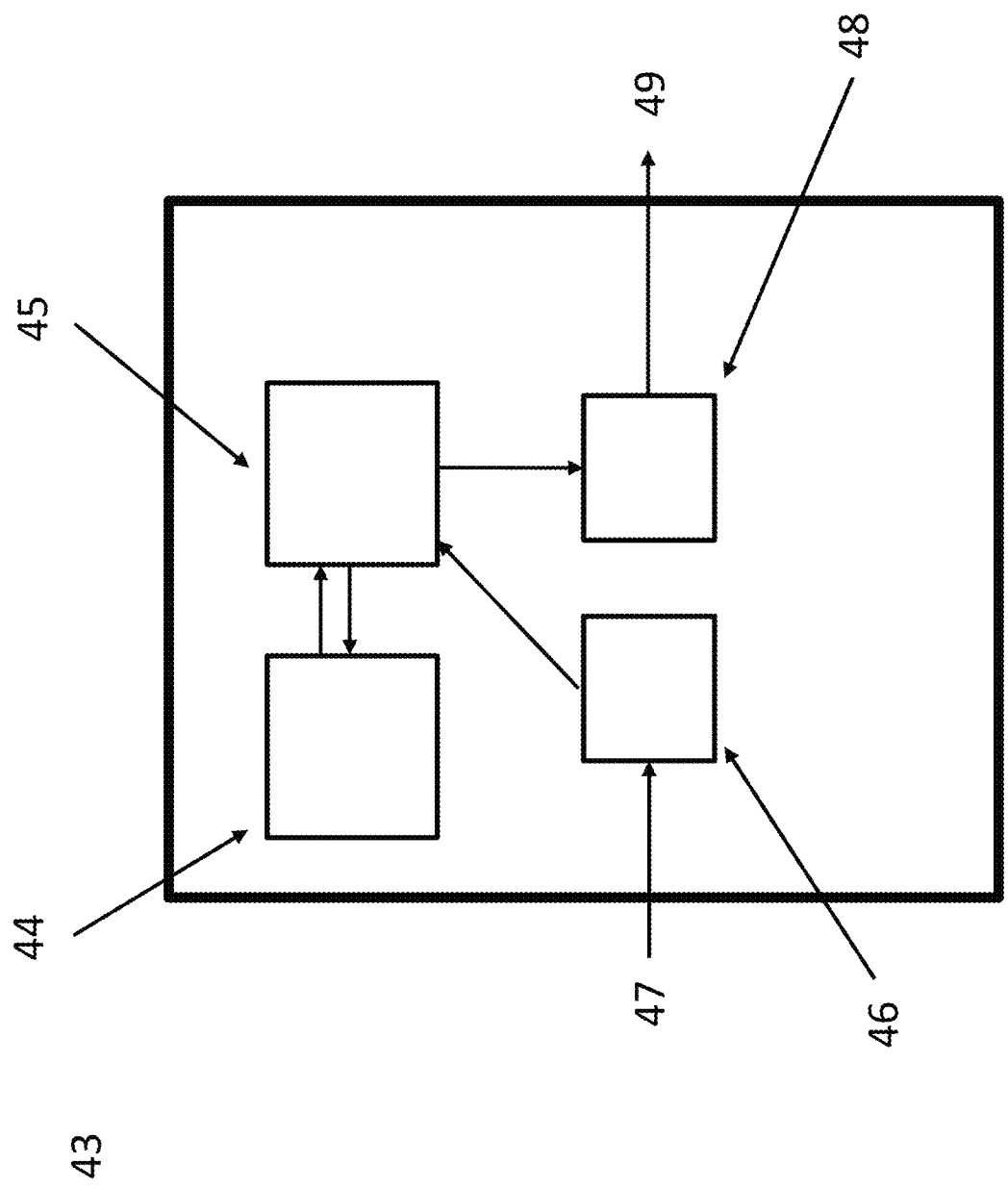
FIG. 7 is a schematic diagram of a network node apparatus.

FIG. 7 is a schematic diagram of a network node apparatus (43) configured to perform the operations required to implement these methods. There are two distinct operations. The first is that of receiving and interpreting an explicit indication, and performing an appropriate handling of the path to which the explicit indication relates. The second is that of identifying a backup flow, providing an explicit indication of a backup path and transmitting it. Although the receiving and transmitting functions are shown together in a single apparatus, the person skilled in the art will appreciate that the two functions are separate operations and it is possible to have a network node with only apparatus for receiving an explicit indication. It is also possible to have a network node with only the apparatus for transmitting an explicit indication. The apparatus (43) comprises a memory for storage of instructions (44) which interacts with processing circuitry (45). Processing circuitry (45) is configured to take data from receiver (46) from incoming signal (47) and interpret the explicit indication. The apparatus is further configured to use the explicit indication for handling the backup path as appropriate to the particular type of network node to which it applies. For example, if the node represents an eNodeB, the handling can comprise setting power levels or admission control applied to the path. Alternatively if, for example, the node is the PCRF node then the processing of the explicit indication can result in a different charging regime for the backup path. FIG. 6 also shows the apparatus for transmission of an explicit indication. In this instance, the processing circuitry (45) interacts with memory (44) to identify a backup path. The processing circuitry is configured to create the explicit indication and to pass it on to transmitter (48) which is configured to transmit the indication by means of transmitted signal (49).

Figure 8:
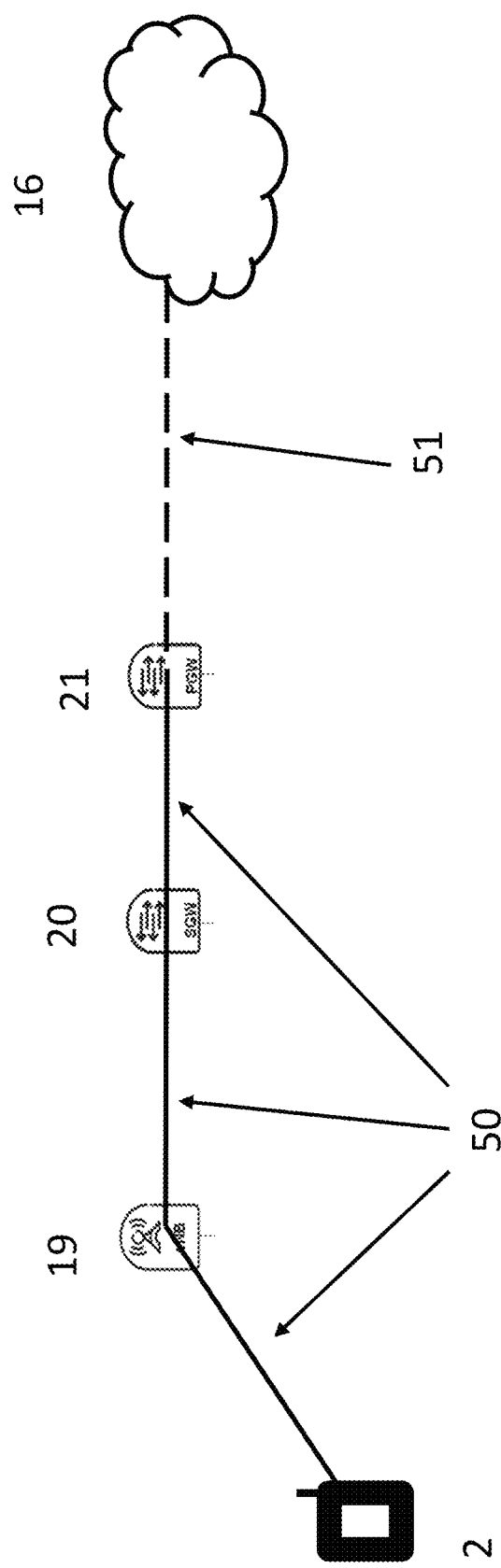
FIG. 8 is a schematic diagram of a typical arrangement for a bearer.
Figure 9:
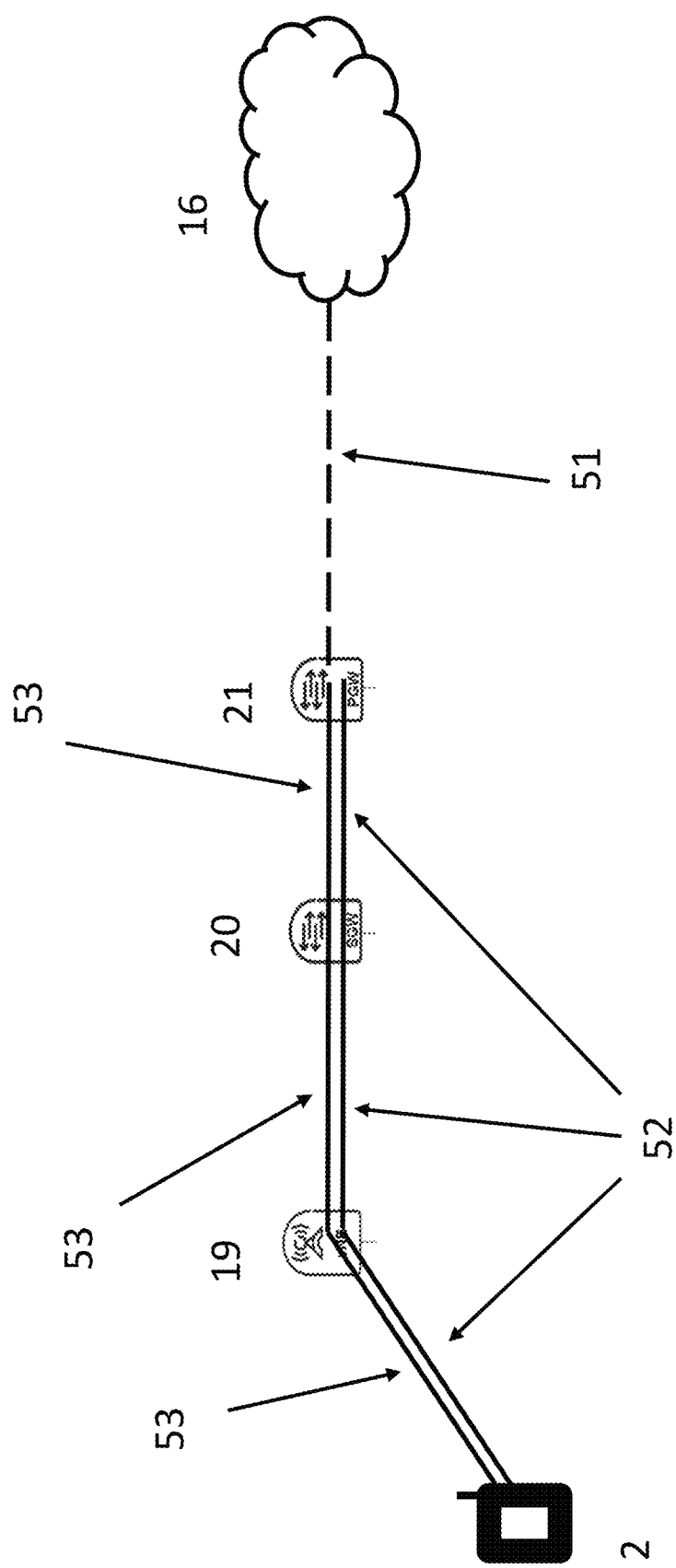
FIG. 9 is a schematic diagram of a typical arrangement for a connection comprising a default and a dedicated bearer.

In an embodiment of the invention the backup flow is supported by a single bearer. FIG. 8 is a schematic diagram showing a typical arrangement for a bearer, which shows a network comprising UE (2), eNodeB (19), SGW (20) and PDN-GW (21), supporting an EPS bearer (50). An external bearer (51) takes the connection further from the PDN-GW (21) into external network (16). In the embodiment of FIG. 8 the EPS bearer is a default bearer. Default bearers always set up with every new connection. In addition to default bearers, connections may also have additional dedicated bearers. FIG. 9 is a schematic diagram showing a typical arrangement comprising a default (52) and a dedicated bearer (53).

Figure 10:
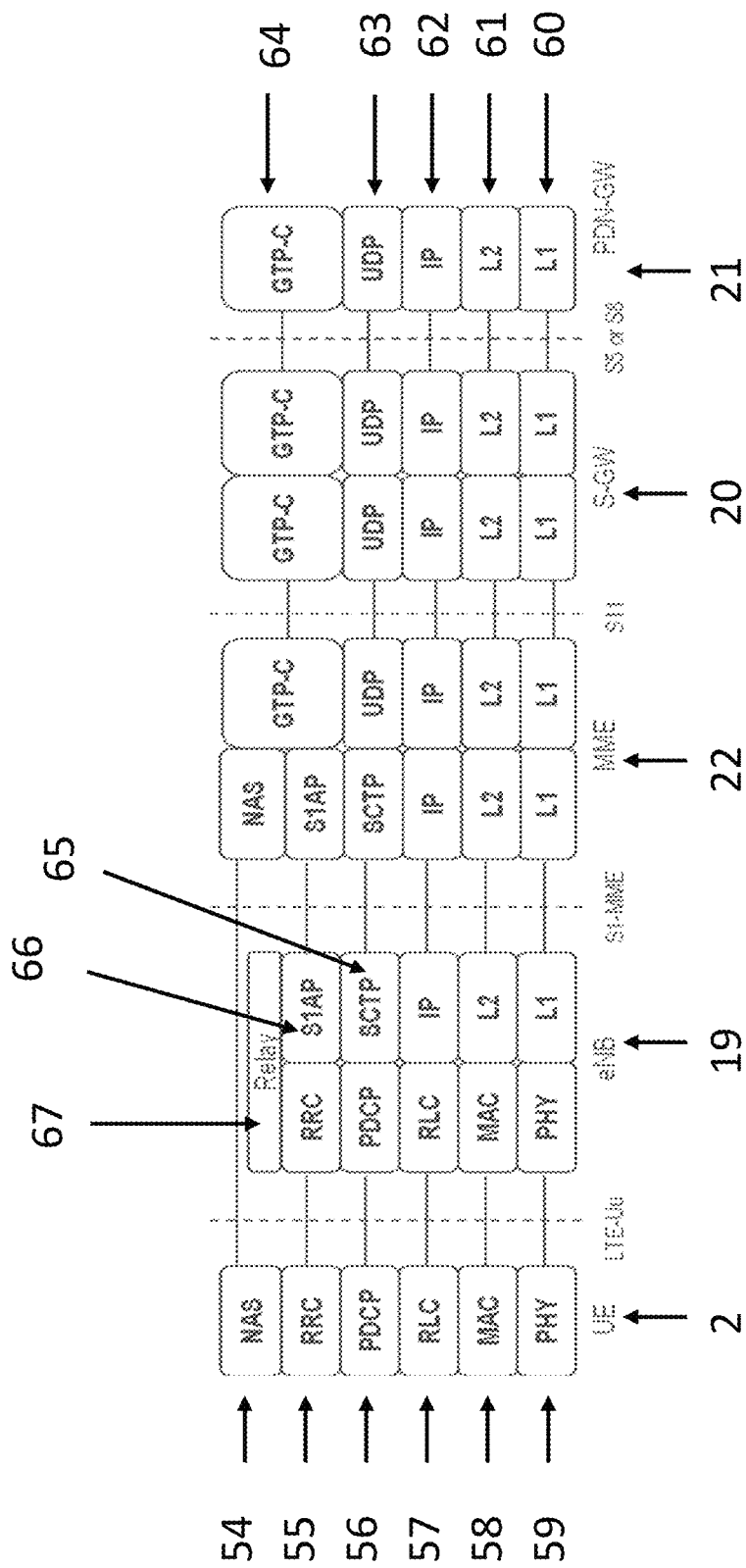
FIG. 10 is a stack diagram for the control plane in the Evolved Packet Core (EPC) and Long Term Evolution (EPC)

The signalling for the setup and modification of bearers takes place in the control plane for an LTE/EPC network. FIG. 10 is a protocol stack diagram for the control plane. It is illustrates the operation of the protocols between UE (2), eNodeB (19), MME (22), SGW (20) and PDN-GW (21). The control plane signalling from UE (2) comprises Non-access stratum signalling (54) which links UE (2) logically with MME (22) although this normally goes through eNodeB (19), which acts as a transparent relay (67) and the Access Stratum, which, comprises radio resource control (RRC) (55), Packet Data Convergence Protocol (PDCP) (56), radio link control (RLC) (57), Medium Access Control (MAC) layer (58) and physical layer (PHY) (59). The Access stratum links UE (2) with eNodeB (19). eNodeB (19) is linked to MME (22) by S1AP (66), which is served by Stream Control Transport Protocol (SCTP) (65), IP layer (62), L2 (61) and L1 (60). The rest of the protocol stack shows the signalling within the core network between MME (22), SGW (21) and PDN-GW (22). Core network nodes MME (22), SGW (20) and PDN-GW (21) are linked by means of GPRS Tunnelling Protocol (control plane) GTP-C (64) which is served by the User Datagram Protocol (UDP) (63), IP layer (62), L2 (61) and L1 (60).

Figure 11:
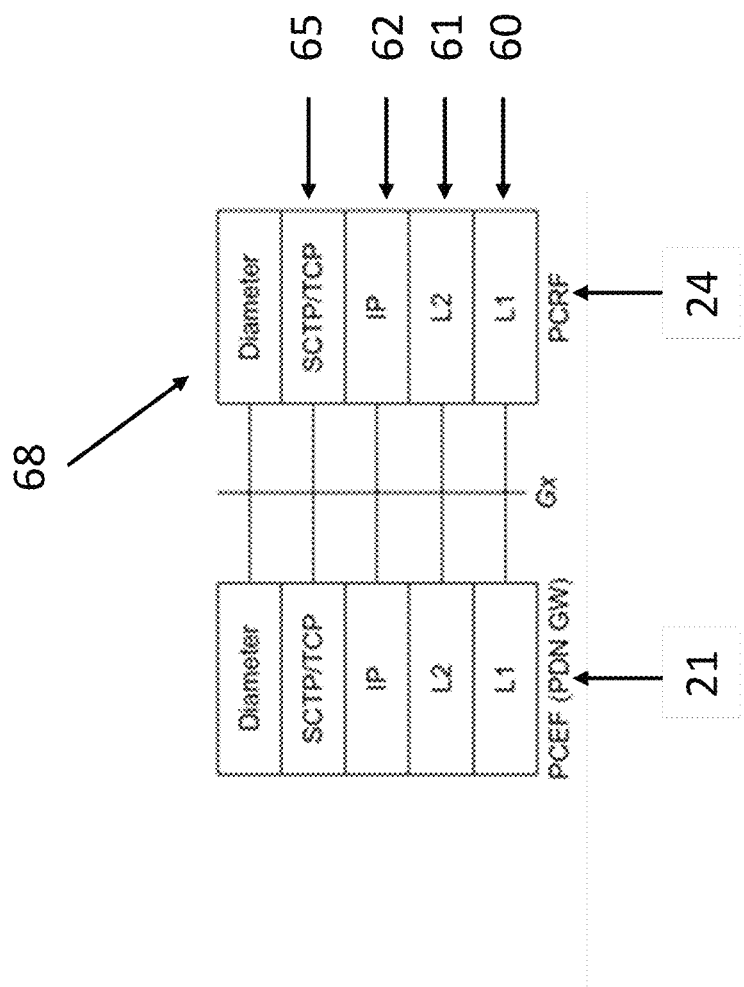
FIG. 11 is a stack diagram for the Gx interface.

FIG. 11 is another protocol stack diagram which links the Policy Charging Rules Function (PCRF) (24) with PDN-GW (21). This uses the Diameter protocol (68) which is supported in the transport layer by the SCTP or TCP (65) which is then supported by IP layer (62), MAC layer L2 (61) and physical layer L1 (60).

Figure 12:
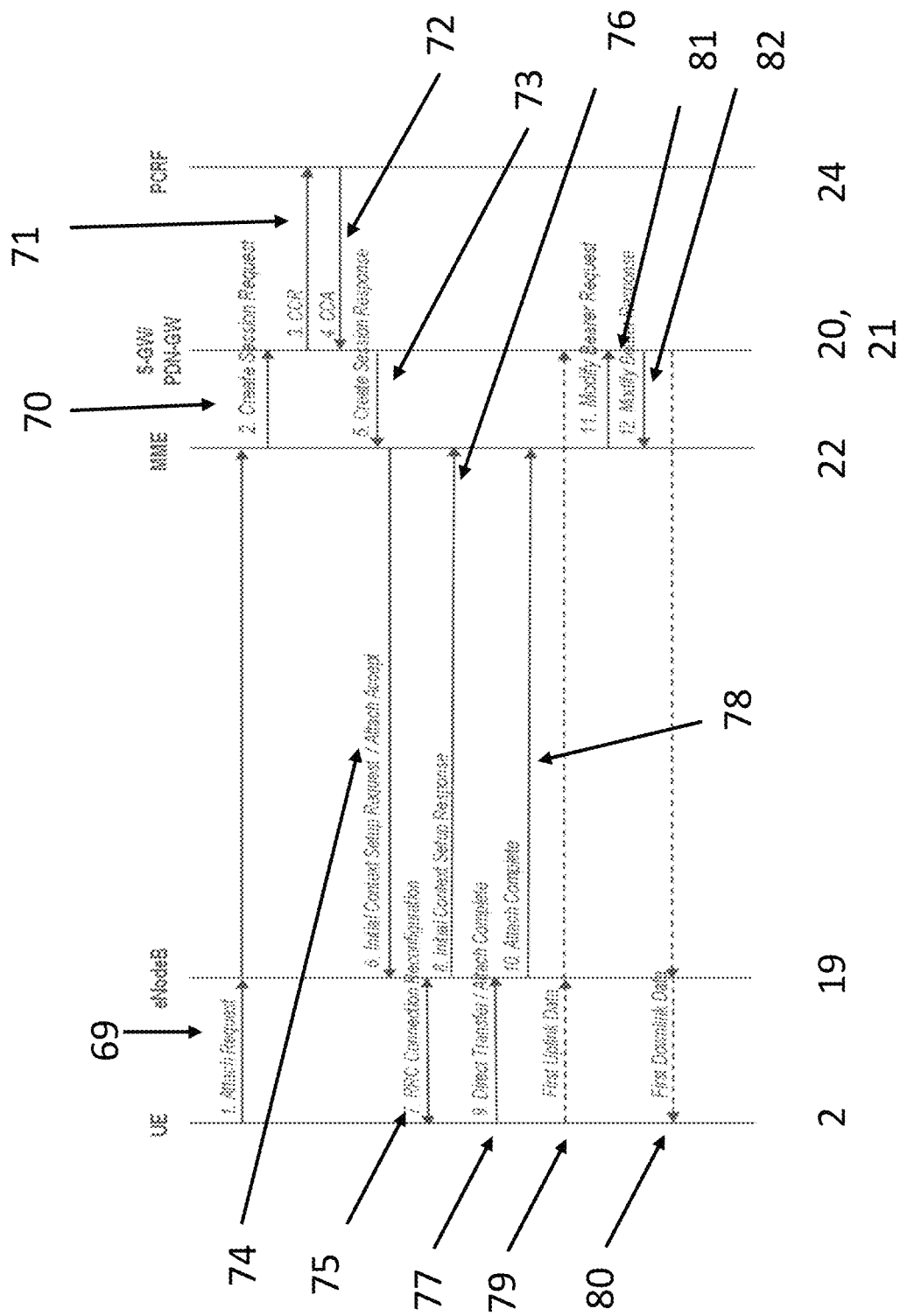
FIG. 12 is a signalling diagram of the set-up of a bearer.

In embodiments described above the explicit indication is provided in a bearer set-up request or a bearer modification request. FIG. 12 is a signalling diagram showing the set-up of a bearer. It begins at the user equipment (2) and involves an Attach Request (69) being sent to eNodeB (19). Attach Request (69) is then sent to MME (22) which in turn sends Create Session Request (70) to SGW (20) and PDN-GW (21). The next step is to send Credit Control Request (CCR) (71) to PCRF (24) which responds with Credit Control Answer (CCA) (72). This is passed to SGW (20) and PDN-GW (21) which in turn pass the Create Session Response (73) back to MME (22). An Initial Context Setup Request/Attach Accept (74) is sent to eNodeB (19), whereupon RRC connection signalling (75) is performed between eNodeB (19) and the UE (2). An Initial Context Setup Response (76) is sent eNodeB (19) and MME (22) which is followed by Direct Transfer/Attach Complete indication (77) between UE (2) and eNodeB (19) and an Attach Complete indication (78) between eNodeB (19) and MME (22). This will result in uplink data (79) and downlink data (80) starting to flow. Should the bearer need to be changed at a later point then a Modify Bearer Request is sent (81) which elicits a response in the form of a Modify Bearer Response (82).

Figure 13:
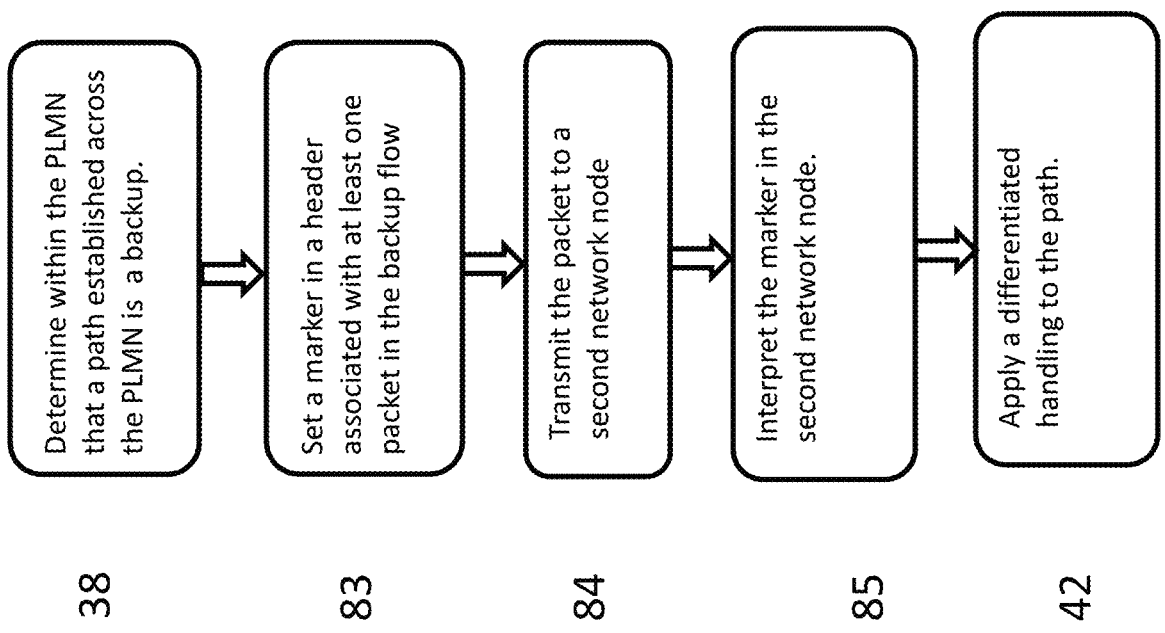
FIG. 13 is a flow diagram for another method of providing and transmitting an explicit indication of a backup path.

FIG. 13 is a flow-diagram for a method according to another embodiment of the invention. In this embodiment instead of providing the indication of a backup path into the set-up or modification requests for a bearer, the explicit indication is done in the form of packet marking. The packet marking technique allows for different treatment of SDF's within the same bearer. As previously, it is determined, typically from an indication from higher layer protocols, that the service is a backup path (38). An explicit indicator is then set (83) in a header associated with at least one packet in the backup subflow. In one embodiment this is done in a GPRS Tunnelling Protocol (user plane) (GTP-U) header. In an alternative embodiment it is done in an IP layer. The next step (84) is to transmit the packet to a second network node. At the second network node the packet marker is interpreted (85) and an appropriate handling (42) applied to the path. In this instance it is not the bearer level but the specific flow within the bearer to which the handling is applied.

Figure 14:
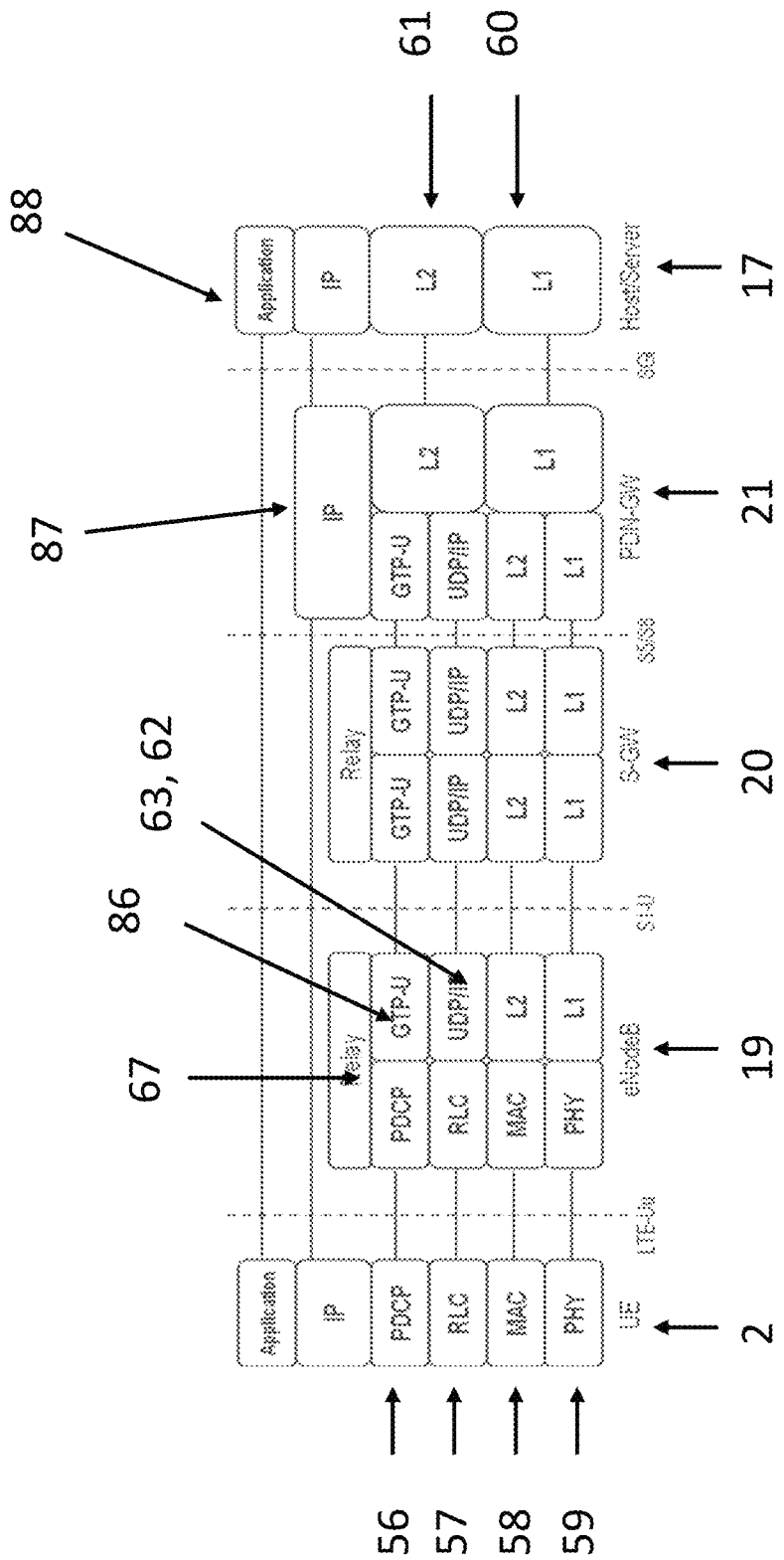
FIG. 14 is a stack diagram for the user plane in Evolved Packet Core (EPC) and Long Term Evolution (LTE)

In the embodiment with packet marking, the explicit indication is carried with packets in the user plane rather than the control plane. FIG. 14 is a stack diagram for the User Plane in the EPC and LTE. Between UE (2) and eNodeB (19) the lower four protocol layers are PDCP layer (56), RLC (57) MAC layer (58) and the Physical Layer (59). On the core network side between eNodeB (19), SGW (20) and PDN-GW (21), the four lower layers are GTP-U (86), UDP/IP (63,62), L2 (61) and L1 (60). User data is transported by an IP stream (87) which begins at UE (2). These IP packets are encapsulated using GTP-U and are passed transparently through the eNodeB and SGW (20) to PDN-GW (21) where they are terminated. Transmission of application layer (88) continues to the host or server (17) in the internet by means of regular TCP/IP, UDP/IP or other suitable protocol. In an embodiment packet marking is performed using an indication in a GTP-U header. In another embodiment the marking is performed in an IP layer. The person skilled in the art will appreciate that other options are possible and the invention is not limited to providing an explicit indication in any one protocol layer.

It is likely that different services will require different levels of backup. For some applications, for example, remote health monitoring, remote health care, monitoring of large advanced systems, power grid management and other industry automation control, there is very little room for unreliability. For such applications, operators and consumers need to make sure that as long as technically possible and feasible all measures are taken such that nothing in fact goes wrong. On the other hand other applications such as voice, or video or ordinary Internet connections may be served with a far lower level of reliability. In such cases, a lower level of backup may be required. To achieve this differentiation of requirements, different QOS levels for the backup paths may be provided. In an embodiment, a Flow Type Indicator (FTI) is provided which allows an indication of the type of backup path. In a further embodiment, the FTI may indicate not just the different types of back up path but in addition may provide other information about different types of path other than backup paths. In an embodiment, four different levels are provided. The first of these is an additional path provided for an earlier established flow i.e. a backup. A second one will be a path that should be realised over at least two EPS bearers with the same or different QOS parameters. The third is a flow which is new and not related to any other known communication in the PCRF or PDN-GW. And finally a backup flow that is added and associated with an existing flow with or where the backup flow is associated with a certain value on what type of need that may become necessary. The person skilled in the art will appreciate that other types are possible and the invention is not limited to any particular number of classes of flow type.

In yet another embodiment, an indication as to the resources which are potentially required for implementing a switch to backup path is provided. These potentially required resources are referred to as the Immediate Characteristic Needs (ICN) of a connection. In addition to the priority level of the traffic there are two main aspects to the immediate characteristic needs, the bit-rate that is required for a connection and the speed at which a backup path may be needed. In an embodiment these requirements are communicated between nodes in an ICN indicator associated with a backup path.

Figure 15:
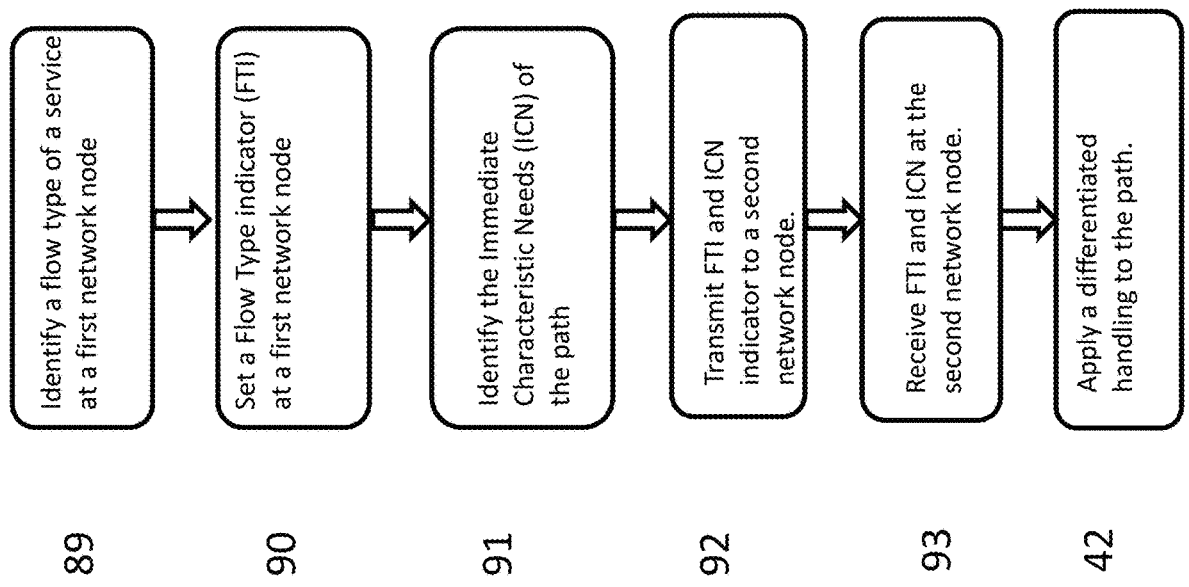
FIG. 15 is a flow diagram for a method of providing and transmitting a Flow Type Indicator and an Immediate Characteristic Needs.

FIG. 15 is a flow diagram of an embodiment of the invention which incorporates an FTI and an ICN indicator. The method according to this embodiment begins with the identification of a flow type for associated with particular type of service (89). The FTI is set (90) to the required flow type. Once the flow type indicator has been set the ICN of the path are identified (91), and FTI and ICN indicator are transmitted (92) along with the explicit indication, if needed, of the backup path. The indications are received at a second network node (93), where an appropriate handling of the path is performed based upon the received indications (42).

In an embodiment, the handling of the path may be the provision of a particular level of QOS. Alternatively it may be a charging function performed at the PCRF. If the receiving node is an eNodeB, it may also be connection admission control or control of a power level for the signal associated with the path. The person skilled in the art will appreciate that the provided indications may be used for any handling of a path and the invention is not limited to any particular use for the provided explicit indication of backup path, Flow Type Indicator or Immediate Characteristic Needs.

Although the FTI and ICN of the path are shown together as one embodiment in FIG. 15 the person skilled in the art will appreciate that these are in fact separate entities and may be implemented separately in a network. It is possible to have an FTI indicating the type of flow without any indication of Immediate Characteristic Needs. Likewise the ICN may be combined with the explicit indication of a backup path without the presence of an FTI. The person skilled in the art will appreciate that different combinations of these indicators may be used according to specific network requirements and the invention is not limited to any particular combination or combinations of use of these indicators.

In a further embodiment of the invention the FTI is used at the PDN-GW to further handle the connection. Additional rules that may be related to the FTI would be that the PDN-GW should set up identical flows of communication to the user equipment, such that the same information is communicated between the UE and an application server over two separate realisations. For example, this might be over the LTE and over a Wi-Fi connection. Alternatively it might be over two radio accesses, or even one radio access and one fixed access. The FTI could further indicate that there should be one connection set up with a default bearer and one connection set up over a Wi-Fi connection. In yet another embodiment there may be rules in the PCRF for critical applications to indicate that mapping should be done on two EPS bearers, one which may be a default EPS bearer and another over an additional EPS bearer. These EPS bearers may be further realised over different physical connections.

Figure 16:
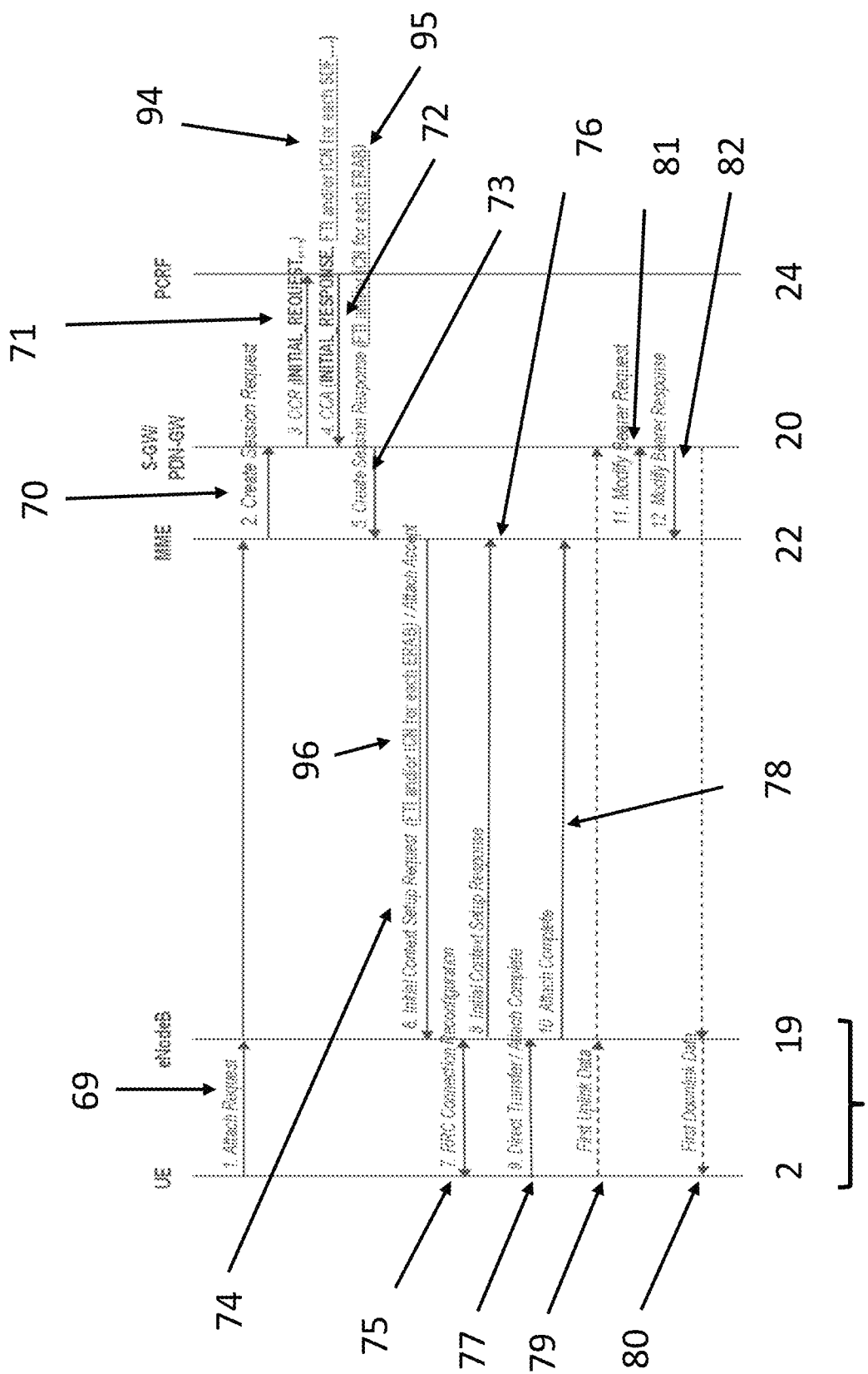
FIG. 16 is a signalling diagram of the implementation a method of providing and transmitting a Flow Type Indicator and an Immediate Characteristic Needs.

FIG. 16 is a signalling diagram for an embodiment providing an FTI and/or an ICN, in which a PCRF node (24) signals to the Radio Access Network (RAN) (11) at initial UE attachment. An FTI and/or an ICN for each Service Data Flow (SDF) is provided (94) in the CCA response (72). These are in turn passed on (95) in the Create Session Response (73) and the Initial Contact Set Up Request/Attach Accept (96) to the eNodeB (19).

Figure 17:
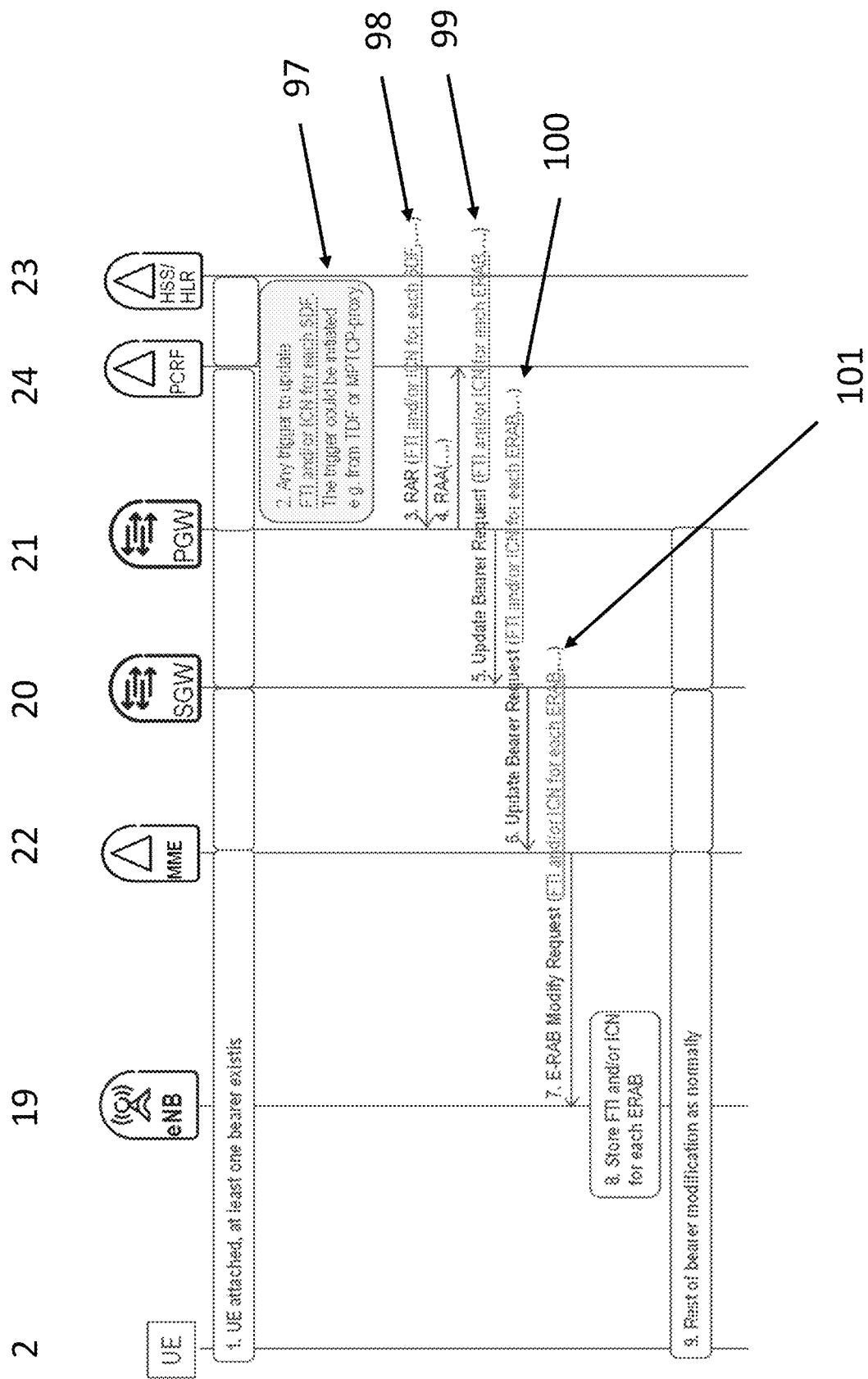
FIG. 17 is a signalling diagram of the implementation another method of providing and transmitting a Flow Type Indicator and an Immediate Characteristic Needs.

FIG. 17 shows another embodiment of the invention in which this process is performed at bearer modification. Here the bearer modification is triggered (97) at PCRF node (24). As in the previous embodiment FTI and ICN for each SDF is sent (98) from PCRF (24) to PDN-GW (21) and hence in Update Bearer Request (99) to SGW (20). A further Update Bearer Request (100) containing FTI and ICN indicator is sent to MME (22) and an E-UTRAN Radio Access Bearer (E-RAB) Modify Request (101) containing the same information is sent to eNodeB (19). Such bearer modification may be the result of a number of different triggers. One type trigger is a notification from an entity connected to the PCRF that signals the existence of backup paths to the PCRF. One example of this is that an MPTCP proxy signals to the PCRF node that a specific path is a backup. The MPTCP proxy is aware of the MPTCP related signalling and can detect the B-bit. It then signals the existence of backup paths to the PCRF. The signalling can include information needed for the TFT to identify a backup path. Another example is that a Traffic Detection Function (TDF) performs packet inspection on different levels, identifies backup sub-flows and informs the PCRF about the existence of the backup paths and provides the information needed for the traffic templates. The person skilled in the art will appreciate that the embodiments of FIGS. 16 and 17 provide examples of the use of FTI and ICN, but other uses within the network are possible. The invention is not limited to any particular signalling or use of the FTI and ICN.

The present disclosure has mainly been described above with reference to a few embodiments. However, as is readily appreciated by a person skilled in the art, other embodiments than the ones disclosed above are equally possible within the scope of the present disclosure, as defined by the appended claims.

The invention claimed is:

1. A method for handling multipath connections in a communication system, wherein the communication system comprises a public land mobile network (PLMN), the method comprising the steps of:
   determining within the PLMN that a path, established across the PLMN, is a backup path of a multipath connection;
   providing an explicit indication to one or more nodes within the PLMN that the determined path is the backup path using a protocol layer that is otherwise unaware of the multipath connection, wherein the step of providing the explicit indication comprises the step of setting a marker associated with a packet transmitted to the one or more nodes, and wherein the marker is located in a GPRS Tunneling Protocol (user plane) (GTP-U) header;
   identifying an Immediate Characteristic Needs (ICN) set of the determined backup path, wherein the ICN set comprises a bit rate at which a backup must be supplied and a speed at which the backup path is needed;
   transmitting an indication of the ICN set to the one or more nodes; and
   applying, at each of the one or more nodes, a handling to the determined backup path, based on the transmitted indication of the ICN set, which is different from a handling of non-backup paths.

2. The method as claimed in claim 1, wherein the multipath connection comprises a Multi-Path Transmission Control Protocol (MPTCP) connection.

3. The method as claimed in claim 1, wherein the one or more nodes comprise one or more of: an eNodeB, a Management Mobility Entity (MME), a Serving Gateway (SGW), a Packet Data Node Gateway (PDN-GW), a Policy Charging and Rules Function (PCRF) node, and a Home Subscriber Server (HSS).

4. The method as claimed in claim 1, further comprising the step of setting a flow type indicator to indicate a type of flow of a service.

5. The method as claimed in claim 4, wherein the flow type indicator indicates that the type of flow is one of: an additional flow to an earlier established flow, a flow that should be realised over at least two Evolved Packet System (EPS) bearers, a flow that is new and not related to any other flow, and a backup flow.

6. The method as claimed in claim 1, wherein the step of applying the handling to the determined path comprises one or more of: implementation of a Quality Of Service mechanism, a resource management, or a charging function.

7. An apparatus for use in a Public Land Mobile Network (PLMN), the apparatus comprising processor circuitry, a storage unit for storing instructions executable by the processor circuitry, and a transmitter, whereby the apparatus is operative to:
- determine within the PLMN that a path, established across the PLMN, is a backup path of a multipath connection;
- provide an explicit indication to one or more nodes within the PLMN that the determined path is a backup path using a protocol layer that is otherwise unaware of the multipath connection, wherein the explicit indication is provided in a marker associated with a packet transmitted to the one or more nodes within the PLMN, and wherein the marker is located in a GPRS Tunneling Protocol (user plane) (GTP-U) header;
- identify an Immediate Characteristic Needs (ICN) set of the determined backup path, wherein the ICN set comprises a bit rate at which a backup must be supplied and a speed at which the backup path is needed; and
- transmit the explicit indication and an indication of the ICN set to the one or more nodes within the PLMN.

8. The apparatus as claimed in claim 7, further configured to: provide a Flow Type Indicator to indicate a type of flow of the backup path and transmit the Flow Type Indicator to the one or more nodes.

9. The apparatus as claimed in claim 8, wherein the Flow Type Indicator indicates that the type of flow is one of: an additional flow to an earlier established flow, a flow that should be realised over at least two Evolved Packet System (EPS) bearers, a flow that is new and not related to any other flow, and a backup flow.

10. A network node comprising an apparatus as claimed in claim 7, wherein the network node is one of: an eNodeB, a Management Mobility Entity (MME), a Serving Gateway (SGW), a Packet Data Node Gateway (PDN-GW), a Policy Charging and Rules Function (PCRF) node, and a Home Subscriber Server (HSS).

11. An apparatus for use in a Public Land Mobile Network (PLMN), the apparatus comprising processor circuitry, a storage unit for storing instructions executable by the processor circuitry, and a receiver, whereby the apparatus is operative to:
- receive an explicit indication from one or more nodes within the PLMN that a path established across the PLMN is a backup path of a multipath connection, the explicit indication being located in a protocol layer that is otherwise unaware of the multipath connection, wherein the explicit indication is provided in a marker associated with a packet transmitted to the one or more nodes, and wherein the marker is located in a GPRS Tunneling Protocol (user plane) (GTP-U) header;
- receive and interpret an Immediate Characteristic Needs (ICN) set of the backup path, wherein the ICN set comprises a bit rate at which a backup must be supplied and a speed at which the backup path is needed; and
- in response to the explicit indication and the ICN set, apply a handling to the backup path, based on the received indication of the ICN set, which is different from a handling of non-backup paths.

12. The apparatus as claimed in claim 11, further configured to: receive and interpret a Flow Type Indicator to indicate a type of flow of the backup path.

13. The apparatus as claimed in claim 11, further configured to: transmit an indication of the ICN set to the one or more nodes.

14. The apparatus as claimed in claim 11, wherein the application of handling to the backup path comprises one or more of: implementation of a Quality Of Service mechanism, a resource management, or a charging function.

* * * * *